United States Patent [19]

Fukuda et al.

[11] Patent Number: 4,877,498
[45] Date of Patent: Oct. 31, 1989

[54] METHOD FOR PRODUCING A METAL SALT BY ELECTROLYSIS

[75] Inventors: Kenichi Fukuda; Takashi Mori; Yasuhiro Kurauchi; Masaharu Doi, all of Shin-nanyo; Tetsuya Suematsu, Tokuyama, all of Japan

[73] Assignee: Toyo Soda Manufacturing Co., Ltd., Snin-nanyo, Japan

[21] Appl. No.: 198,663

[22] Filed: May 23, 1988

Related U.S. Application Data

[63] Continuation of Ser. No. 35,309, Apr. 7, 1987, abandoned.

[30] Foreign Application Priority Data

Apr. 7, 1986 [JP] Japan ................................. 61-78255
Jun. 13, 1986 [JP] Japan ................................. 61-135890

[51] Int. Cl.$^4$ .......................... C25B 1/00; C08D 5/20
[52] U.S. Cl. ........................ 204/86; 204/296; 521/27

[56] References Cited

U.S. PATENT DOCUMENTS 4,219,443  8/1980  Klinedinot et al. ............. 429/196
4,567,206  1/1986  Matsui et al. .................... 521/27
4,659,744  4/1987  Matsui et al. .................... 521/32

FOREIGN PATENT DOCUMENTS 0113481  7/1984  European Pat. Off. .
0166015  1/1986  European Pat. Off. .

OTHER PUBLICATIONS

Chemical Abstracts, vol. 101, No. 12, Sep. 1984, p. 587, abstract no. 100259p, Columbus, Ohio, US, & JP-A-59 83 785, (Nippon Soda Co., Ltd), 15-05-1984, *Whole Abstract*.
Patent Abstracts of Japan, vol. 7, No. 131, (C-169), [1276], Jun. 8, 1983, & JP-A-58 45 386, (Tanaka Kikinzoku Kogyo K. K.), 16-03-1983.

*Primary Examiner*—John F. Niebling
*Assistant Examiner*—Kathryn Gorgos
*Attorney, Agent, or Firm*—Oblon, Spivak, McClelland, Maier & Neustadt

[57] ABSTRACT

A method for producing a metal salt by electrolysis in an electrolytic cell comprising an anode compartment and a cathode compartment partitioned by a diaphragm, disposing in the anode compartment a metal anode soluble in the aqueous solution, and conducting electrolysis to dissolve the metal anode, wherein the diaphragm is a fluorinated anion exchange membrane made of a copolymer having repeating units of the formula:

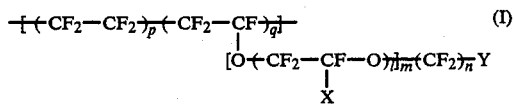

wherein X is F or $CF_3$, l is an integer of from 0 to 5, m is 0 or 1, n is an integer of 1 to 5, each of p and q is a positive number and the ratio of p/q is from 2 to 16, and Y is a group involving a quaternary ammonium group.

11 Claims, 2 Drawing Sheets

METHOD FOR PRODUCING A METAL SALT BY ELECTROLYSIS

This application is a Continuation of application Ser. No. 035,309, filed on Apr. 7, 1987, now abandoned.

The present invention relates to a method for producing a metal salt by dissolving a metal by electrolysis by means of an ion exchange membrane electrolysis wherein a special fluorinated anion exchange membrane is used as a diaphragm.

In metal-related industrial fields, waste solutions containing metals are discharged in large amounts, and it is important to recover such metals from the waste solutions from the standpoint of effective utilization of resources. Especially when a noble metal is contained in a waste metal, it is essential to recover such noble metal. If a metal hazardous to human bodies such as a radio active metal, mercury or cadmium is contained in the waste metal, it is necessary to completely recover and properly treat such a hazardous metal within the site of the plant. An electrolytic recovery method, a chemical recovery method, an adsorption recovery method or a solvent extraction method may be mentioned as the method for the recovery of metals. In most of these methods, the metal is recovered in the form of a metal itself or in the form of the metal salt. Particularly, in the metal plating industry, in the metal catalyst manufacturing industry or in the industry for the production of photographic light-sensitive materials, metal salts are mainly used. Accordingly, a method is employed wherein a metal in a waste solution is recovered in the form of a metal salt. Therefore, it has been desired to develop a treating system whereby a metal in the waste solution is recovered efficiently to the form of a metal salt.

For the production of a metal salt from a metal, it has been common to employ a method wherein a solution obtained by dissolving a metal with a strong acid, is heated and concentrated, followed by cooling for crystallization, and the crystal is separated from the mother liquor and dried to obtain a product. However, in such a method, if the metal is silver, nitrous acid gas is generated when it is dissolved in nitric acid, whereby an environmental problem is likely to be created. Further, among various metals, there are some which are hardly soluble in a strong acid. In such a case, it is required to maintain the dissolving solution at a high temperature, or it is required to stir the dissolving solution, whereby the production cost increases. Especially when a metal is recovered by an electrolytic method, it is deposited on an electrode, and it is not efficient to dissolve it as deposited on the electrode. It is theoretically conceivable that the metal recovered by the electrolytic method is subjected to electrolysis as an anode and is thereby forcibly dissolved. However, as a practical matter, unless there is an ion exchange membrane having an adequate separating ability and durability, the dissolved metal is likely to recrystallize on the counter electrode. Therefore, it is necessary to develop such an ion exchange membrane. Ion exchange membranes so far available have a problem in the durability, e.g. in the acid resistance, and there has been no process for the production of a metal salt by an ion exchange membrane electrolysis, which is applicable to processes for the production of various metal salts.

On the other hand, as a method for producing gold potassium cyanide which is useful primarily for a gold plating solution, there is a method wherein gold is dissolved in a potassium cyanide solution by means of an oxidizing power of hydrogen peroxide, followed by purification by crystallization (hereinafter referred to as a "hydrogen peroxide method"), or a method wherein gold is dissolved in aqua regia and treated with ammonia to obtain fulminating gold, which is then dissolved in potassium cyanide, followed by concentration for crystallization (hereinafter referred to as an "ammonia method"). However, in the case of the hydrogen peroxide method, potassium hydroxide is produced as a by-product, which causes a deterioration in the yield of gold potassium cyanide during the purification of the crystal, whereby the productivity for the production of gold potassium cyanide is poor. On the other hand, in the ammonia method, the amounts of the reagents such as aqua regia and ammonia are substantial, and the method involves a number of process steps, whereby the production cost is high.

As an alternative method, there is an electrolytic method wherein an asbestos diaphragm is used, i.e. a method wherein a gold anode and a potassium cyanide solution are located in an anode compartment, and gold potassium cyanide is formed in the anode compartment by the electrolysis. However, this method has a draw back that a part of dissolved gold leaks to the cathode compartment and will be reduced to original gold, and potassium hydroxide formed in the cathode compartment leaks into the anode compartment, whereby the productivity for the production of gold potassium cyanide is poor as in the case of the above-mentioned hydrogen peroxide method.

Recently, an improved diaphragm electrolytic method i.e. a cation exchange membrane method has been proposed (Japanese Examined Patent Publication No. 197892/1985). This method is intended to improve a process for the production of gold potassium cyanide by overcoming the drawbacks of the conventional diaphragm electrolytic method by using a cation exchange membrane as the diaphragm. However, this method has a problem such that potassium ions move from the anode compartment to the cathode compartment through the diaphragm, and it is difficult to adjust potassium ions to be used for the production of gold potassium cyanide, whereby it is difficult to obtain a gold potassium cyanide solution having a high concentration.

Accordingly, in the gold plating-related industries, it has been strongly desired to develop a process capable of producing highly pure and highly concentrated gold potassium cyanide at a low cost.

It is therefore an object of the present invention to provide a process for producing a metal salt by an ion exchange membrane method whereby the metal salt can be efficiently recovered in a stabilized condition for a long period of time while preventing leakage of metal ions and/or metal complex ions through the ion exchange membrane.

The present invention provides a method for producing a metal salt by electrolysis in an electrolytic cell comprising an anode compartment and a cathode compartment partitioned by a diaphragm, characterized by disposing in the anode compartment a metal anode soluble in the aqueous solution, and conducting electrolysis to dissolve the metal anode, wherein the diaphragm is a fluorinated anion exchange membrane made of a copolymer having repeating units of the formula:

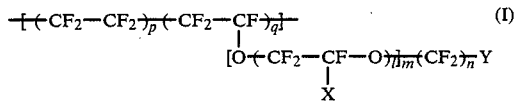 (I)

wherein X is F or CF₃, l is an integer of from 0 to 5, m is 0 or 1, n is an integer of 1 to 5, each of p and q is a positive number and the ratio of p/q is from 2 to 16, and Y is a group involving a quaternary ammonium group.

Now, the present invention will be described in detail with reference to the preferred embodiments.

Figure 1:
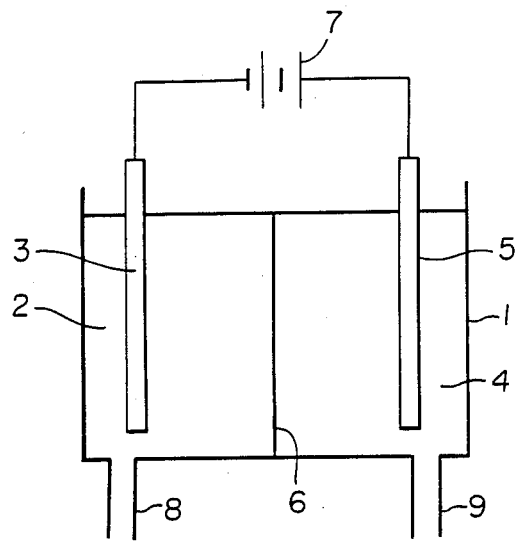
FIG. 1 is a schematic view illustrating an embodiment of the electrolytic process of the present invention.

The fluorinated anion exchange membrane used as the diaphragm in the present invention is made of a copolymer having repeating units of the formula I. The fluorinated anion exchange membrane to be employed in the present invention, preferably has, as the group involving a quaternary ammonium group, a group of the formula:

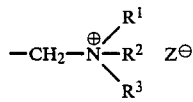

wherein each of $R^1$, $R^2$ and $R^3$ is a lower alkyl group, provided that $R^1$ and $R^2$ may together form a tetramethylene group or a pentamethylene group, and $Z^{\ominus}$ is a halogen anion; a group of the formula:

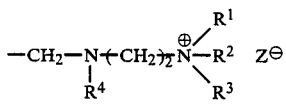

wherein each of $R^1$, $R^2$ and $R^3$ is a lower alkyl group, provided $R^1$ and $R^2$ may together form a tetramethylene group or a pentamethylene group, $R^4$ is a hydrogen atom or a lower alkyl group, and $Z^{\ominus}$ is a halogen anion; a group of the formula:

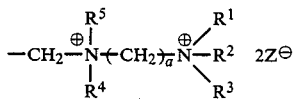

wherein each of $R^1$, $R^2$ and $R^3$ is a lower alkyl group, provided $R^1$ and $R^2$ may together form a tetramethylene group or a pentamethylene group, each of $R^4$ and $R^5$ is a hydrogen atom or a lower alkyl group $Z^{\ominus}$ is a halogen anion, and a is an integer of from 3 to 7; or a group of the formula:

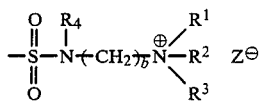

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, $Z^{\ominus}$ is a halogen anion, and b is an integer of from 2 to 10.

When these anion exchange membranes are used as a diaphragm, the concentrated metal solution can be produced stationally during a long period of time because of high durability of these anion exchange membranes against acid or base, especially in aqua regia or cyanide aqueous solution.

According to a preferred embodiment of the present invention, the aqueous solution is an aqueous solution of an acid, and the anion exchange membrane is a fluorinated anion exchange membrane having a group involving any quaternary ammonium group described already.

The following groups may be mentioned as specific examples of the group involving a quaternary ammonium group:

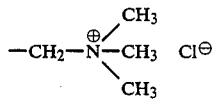

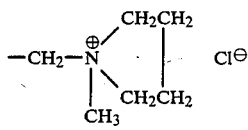

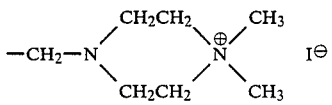

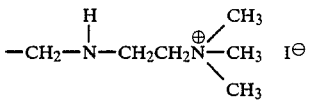

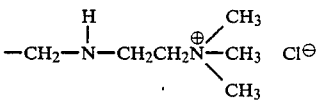

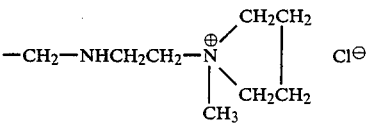

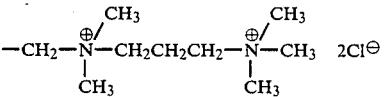

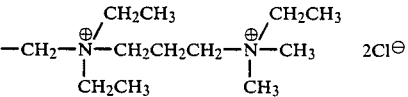

-continued

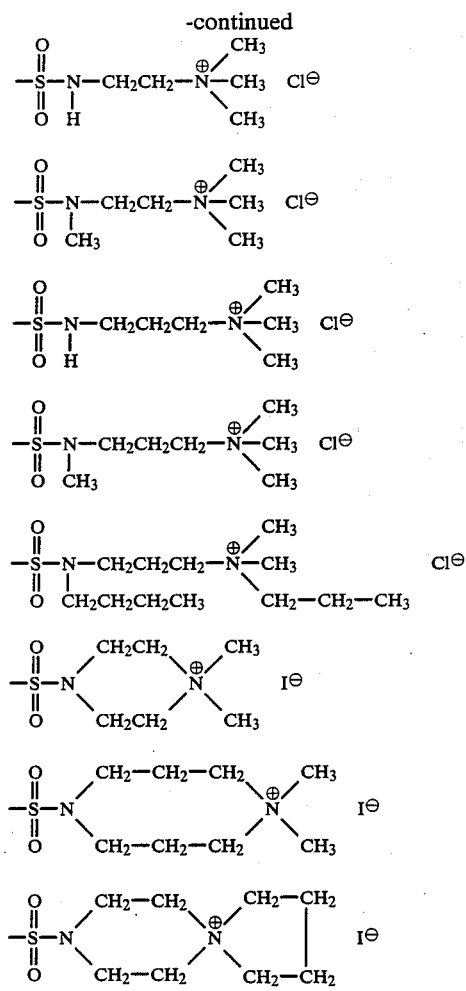

The anion exchange membranes used in the present invention usually have an ion exchange capacity of from 0.16 to 3.0 meq/g dry resin, preferably from 0.5 to 2.8 meq/g dry resin. If the ion exchange capacity is less than the above range, the membrane resistance tends to be high, the cell voltage tends to be high, and the cost for electric power will increase. On the other hand, if the ion exchange capacity exceeds the above range, there will be a problem such as the swelling or disintegration of the membrane, which tends to interfere with a constant stabilized electrolytic operation.

The thickness of the fluorinated anion exchange membrane of the present invention is usually within a range of from 40 to 500 μm, preferably from 100 to 300 μm. Further, a reinforcing material may be introduced to increase the strength of the membrane.

As mentioned above, the anion exchange membranes having a special structure show excellent durability.

In the two compartment electrolytic cell, wherein the anion exchange membrane having a special structure as mentioned above, the metal solution can be produced by the electrolytic dissolution of the metal anode. The electrolytic system of the present invention is shown in FIG. 1.

A soluble metal anode 3 is disposed in an anode compartment 2 of a diaphragm electrolytic cell 1, and an insoluble cathode 5 is disposed in a cathode compartment 4. an aqueous acid solution is supplied to both compartments and an electric current is supplied by a DC power source 7.

Anions such as chlorine ions or cyanide ions transfer from the cathode compartment to the anode compartment through the anion exchange membrane 6, and the metal dissolves in the anode compartment to form a metal salt. As a side reaction, chlorine gas or oxygen gas is generated. On the other hand, in the cathode compartment, hydrogen gas is mainly generated.

When the metal has adequately dissolved, the anolyte and the catholyte are withdrawn from an anolyte outlet 8 and a catholyte outlet 9, respectively. Then, the anolyte and catholyte are supplied afresh, and the electrolysis is resumed. Thus, the recovery of the metal can be conducted intermittently. It is also possible to establish a continuous electrolytic system by providing tanks for the anolyte and catholyte, respectively, and connecting the tanks to the electrolytic cell by pipes so that the withdrawal and supply of the anolyte and catholyte can be continuously conducted.

In such a two compartment electrolysis by using an anion exchange membrane as the diaphragm, the electrolytic cell can be made compart by utilizing the excellent processability of the fluorinated anion exchange membrane, namely it is possible to employ a cylindrical membrane.

The concentration of a metal salt formed in the anode compartment may be within a wide range of from a few ppm of the saturation concentration, and the concentration can suitably be selected depending upon the particular purpose. Likewise, the concentration of the aqueous acid solution to be supplied to both compartments may be within a wide range of from $10^{-2}$ to 10 mols/liter. However, it is preferred to employ the acid in a high concentration close to the saturated concentration to increase the efficiency for dissolving the metal.

The anode and cathode to be used in the present invention may be made of conventional electrode materials. Inexpensive and corrosion resistant electrode materials having a low overvoltage, are suitably selected taking the particular electrolytic process into accounts.

For example, as the anode, a metal soluble in an acid solution such as Pt, Au, Ag, Fe, Ni or Co may be employed. As the cathode, a noble metal, a metal such as Ti, Ta, Zr or Nb, or an electrode obtained by coating a platinum group metal such as Pt, Ir or Rh and or an oxide of a platinum metal group on the surface of a substrate of these metals, may be employed.

The electrolytic temperature of the diaphragm electrolytic cell in the present invention is from room temperature to about 100° C., and the electrolysis can be conducted at a current density within a range of from 0.001 to 50 A/dm².

There is no particular restriction as to the electrolytic conditions for this embodiment. However, the electrolysis is preferably conducted at a cell voltage of not higher than 2 V. Because, there is a limiting value for the concentration of the resulting metal salts, and the metal will not dissolve beyond the limiting value, whereby it is possible that the cell voltage increases abruptly, and metal salts will decompose.

Further, by utilizing a voltage controlling method employing a usual interlock system, it is possible to have the electrolytic operation automated so that when the cell voltage exceeds 2 V, the power will automatically be turned off, and the aqueous metal salts solution is withdrawn from the anode compartment, and at the same time, the electrolytic solution and metal are supplied afresh to the anode compartment, and the electrolysis will be resumed.

Furthermore, we discovered the fact that the anion exchange membrane with the ion exchange capacity different from one side to the other side is effective to suppress the permeation of metal ions and/or metal complex ions through the anion exchange membrane.

As will be described hereinafter, the effect of suppressing the permeation of metal ions and/or metal complex ions through the anion exchange membrane brings about an improvement in the production efficiency of a metal salt in the process for the production of the metal salt.

Namely, in the electrolytic cell used in the present invention, the cathode compartment and the anode compartment are divided by the anion exchange membrane as a diaphragm. In the anode compartment, metal is anode-dissolved to form a metal solution. If the metal ions and/or metal complex ions in this metal salt solution permeate through the anion exchange membrane from the anode compartment to the cathode compartment, such ions will be reduced to original metal in the cathode compartment, whereby the production efficiency of the metal salt deteriorates.

By using the fluorinated anion exchange membrane wherein the ion exchange capacity on one side is different from the ion exchange capacity on the other side, it is possible to suppress the permeation of the metal ions and/or metal complex ions, whereby the production efficiency of the metal salt can be improved. In such an ion exchange membrane, the ratio in the ion exchange capacity between one side and the other side is usually within a range of from 1.1 to 6.0, preferably within a range of from 1.3 to 4.0. If the ratio in the ion exchange capacity is less than the above range, the effect for suppressing the permeation of the metal ions and/or metal complex ions tends to be inadequate, and if the ratio in the ion exchange capacity exceeds the above range, the electricl resistance of the membrane tends to increase. Such a fluorinated anion exchange membrane is preferably disposed so that the side having a small ion exchange capacity faces the anode side where the metal salt forms, and the side having a large ion exchange capacity faces the cathode compartment side, whereby a substantial increase of the production efficiency of the metal salt can be expected, because the penetration of metal ions and/or metal complex ions is suppressed in the side having a small ion exchange capacity.

The anion exchange membrane in which the ion exchange capacity of one side is different from the ion exchange capacity of the other side can be produced by the lamination of two anion exchange membranes having different ion exchange capacities or by the change of the ion exchange capacity with chemical treatment of the anion exchange membrane having ion exchange groups uniformly distributed.

Furthermore, we discovered the fact that the penetration of metal ion and/or metal complex ions through the anion exchange membrane can be suppressed remarkably by using the anion exchange membrane prepared by the method which will be mentioned below. Namely, the anion exchange membranes are prepared by subjecting a carboxylate membrane made of a copolymer having repeating units of the formula:

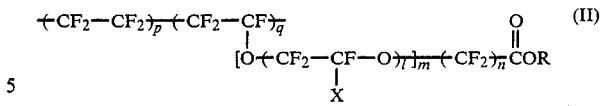

wherein X is F or $CF_3$, l is a integer of from 0 to 5, m is 0 or 1, n is an integer of from 1 to 5, and p/q is from 4 to 16, and R is an alkyl group, to an acid or base treatment, and then introducing anion exchange groups thereinto.

The fluorinated anion exchange membrane to be used in this embodiment is prepared by a special process which comprises subjecting a carboxylate membrane of a copolymer having repeating units of the formula II to an acid or base treatment, and then introducing anion exchange groups thereinto.

More specifically, one side or both sides of a carboxylate membrane made of a copolymer of the formula II such as

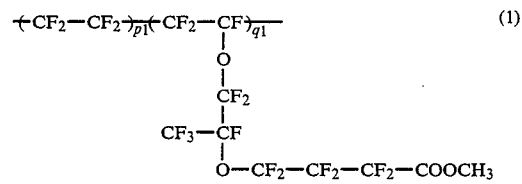

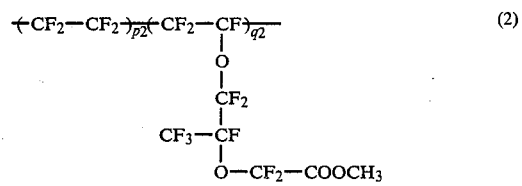

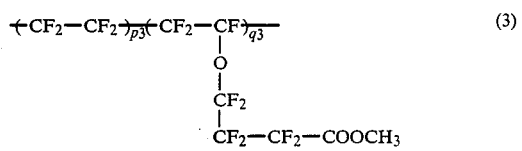

are subjected to an acid or base treatment, followed by the introduction of anion exchange groups.

As the acid or base to be employed, hydrochloric acid sulfuric acid or nitric acid, or aqueous ammonia or sodium hydroxide, may be employed. The acid or base treatment may be conducted at a temperature within a range of from 0° to 80° C.

By the acid or base treatment, the leakage of metal ions and/or metal complex ions will be substantially suppressed when the finally obtained fluorinated anion exchange membrane is used for electrolysis.

The thickness of the membrane to be treated by the acid or base is usually within a range of from 1 to 80% of the entire membrane thickness, preferably within a range of from 10 to 50% of the entire thickness. If the acid or base-treated thickness is less than the above range, the effect for suppressing the leakage of the metal ions and/or metal complex ions through the finally obtained anion exchange membrane tends to be inadequate. On the other hand, if the acid or base-treated thickness exceeds the above range, the electric resistance of the finally obtained anion exchange membrane tends to increase.

The fluorinated anion exchange membrane obtained by the special process according to this embodiment, is obtainable by the introduction of anion exchange groups subsequent to the above-mentioned acid or base treatment.

The following three routes may be mentioned as methods for the introduction of anion exchange groups to the membrane treated with an acid or base as mentioned above.

Route 1

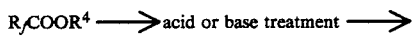

wherein:
R$^1$, R$^2$, R$^3$=lower alkyl group,
R$^4$=lower alkyl group,
Z$^\ominus$=halogen anion, BF$_4^\ominus$, SbCl$_6^\ominus$,

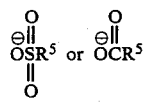

wherein R$^5$=lower alkyl group, substituted or unsubstituted phenyl group, or lower perfluoroalkyl group.

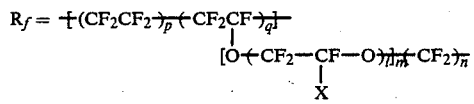

wherein X is F or CF$_3$, l is an integer of from 0 to 5, m is 0 or 1, n is an integer of from 1 to 5, and p/q is from 4 to 16.

Now, Route 1 will be described.

The membrane treated with an acid or base and dried under reduced pressure, is reacted with a lower dialkylamine of the formula:

HNR$^1$R$^2$     (1)

to convert it to a carboxylic acid amide membrane. As the lower dialkylamine of the formula (1), there may be mentioned dimethylamine, diethylamine, dipropylamine or methyl ethyl amine. The reaction with such an amine may be conducted by contacting a gaseous amine to the membrane, or in a liquid amine or by using a solvent. As such a solvent, as ether such as diethyl ether, tetrahydrofuran or dioxane, or a hydrocarbon such as benzene, toluene or hexane, may be employed.

The carboxylic acid amide membrane thus obtained, can be converted to an amine membrane by reacting it with a reducing agent. As the reducing agent, lithium aluminum hydride, diborane or the like may be employed. From the viewpoint of the reaction efficiency, it is preferred to employ diborane. The diborane to be used, may be generated, for example, by reacting a boron trifluoride-ether complex to sodium borohydride, or various complexes of borane, such as a dimethylsulfide complex, may be employed.

The reaction can be smoothly conducted in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The amine membrane thus obtained is reacted with an alkylating agent (R$^3$Z) for alkylation (quaternization), whereby it can be converted to a membrane having quaternary ammonium groups. As the alkylating agent, there may be employed methyl iodide, ethyl bromide, n-propyl bromide, trimethyloxonium fluoroborate ((CH$_3$)$_3$OBF$_4$), triethyloxonium fluoroborate ((C$_2$H$_5$)$_3$OBF$_4$), trimethyloxonium hexachloroantimonate ((CH$_3$)$_3$OSbCl$_6$) or methyl trifluoromethanesulfonate. For this alkylation, methanol, ethanol, methylene chloride, chloroform, carbon tetrachloride or the like may be employed as the solvent.

Here, if it is necessary to exchange the counter ions of the membrane having the groups involving quaternary ammonium groups thus obtained, such as exchange of the counter ions can be conducted by the treatment with an alkali metal salt by a conventional method.

Route 2

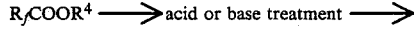

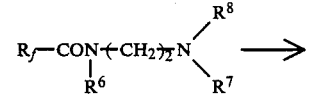

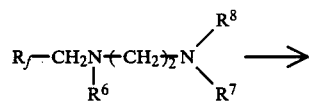

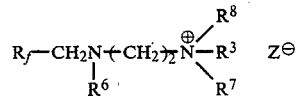

wherein R$^6$ is a hydrogen atom or a lower alkyl group, each of R$^7$, R$^8$ is a lower alkyl group, or R$^6$ and R$^7$ may together form a polymethylene group of the formula (CH$_2$)$_a$ wherein a is an integer of 2 or 3, and R$^3$, Z$^\ominus$ and R$_f$ are as defined above.

Now, Route 2 will be described.

The membrane treated with an acid or base, is reacted with a diamine having the formula:

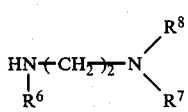     (2)

to convert it to an aminocarboxylic acid amide membrane. As the diamine of the formula (2), N,N-dimethylethylenediamine, N,N,N'-trimethylethylenediamine, N-methylpiperazine or N-propylpiperazine may be mentioned. Instead of the above diamine, a corresponding silyl amine with the above formula (2) in which the hydrogen atom on the nitrogen atom is replaced by a trimethylsilyl group, may be employed.

The reaction with such a diamine, may be conducted in a liquid amine or by using a solvent. As such a solvent, an ether such as diethyl ether, tetrahydrofuran or dioxane, or a hydrocarbon such as benzene, toluene or hexane, may be employed.

The aminocarboxylic acid amide membrane thus obtained, may be converted to a diamine membrane by reacting it with a reducing agent. As such a reducing agent, lithium aluminum hydride or diborane may be employed. In view of the reaction efficiency, it is preferred to employ diborane. The diborane to be used, may be generated, for example, by reacting a boron trifluoride-ether complex to sodium borohydride, or various complexes of borane such as a dimethylsulfide complex, may be employed.

The reaction can be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having the groups involving quaternary ammonium groups. As the alkylating agent, there may be employed methyl iodide, methyl bromide, n-propyl bromide, trimethyloxonium fluoroborate (($CH_3$)$_3$OBF$_4$), triethyloxonium fluoroborate (($C_2H_5$)$_3$OBF$_4$), trimethyloxonium hexachloroantimonate (($CH_3$)$_3$OSbCl$_6$) or methyl trifluoromethane sulfonate. For this alkylation, methanol, ethanol, methylene chloride, chloroform or carbon tetrachloride may be employed as the solvnet.

Here, if it is necessary to exchange the counter ions of the membrane having the groups involving quaternary ammonium groups thus obtained, such as exchange may be conducted by the treatment with an alkali metal salt by a conventional method.

Route 3

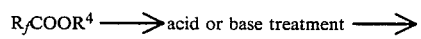

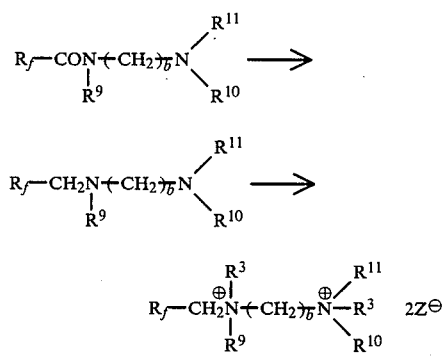

wherein $R^9$ is a hydrogen atom or a lower alkyl group, each of $R^{10}$ and $R^{11}$ is a lower alkyl group, or $R^9$ and $R^{10}$ may together form a polymethylene chain of the formula $(CH_2)_c$ wherein c is an integer of 2 or 3, b is an integer of from 3 to 7, and $R^3$, $Z^\ominus$ and $R_f$ are as defined above.

Now, Route 3 will be described.

The membrane treated with an acid or base is reacted with a diamine having the formula:

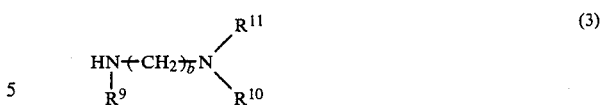

to convert it to an aminocarboxylic acid amine membrane. As the diamine of the formula (3), N,N-dimethylpropanediamine, N,N,N'-trimethylpropanediamine, N,N-dimethylbutylenediamine, N,N,N'-trimethylbutylenediamine or N,N-diethylpropanediamine may be mentioned. Instead of the above diamine, a corresponding silyl amine having the formula (3) with the hydrogen atom on the nitrogen atom replaced by a trimethylsilyl group, may be employed.

The reaction with such a diamine, may be conducted in a liquid amine or by using a solvent. As such a solvent, an ether such as diethyl ether, tetrahydrofuran or dioxane, or a hydrocarbon such as benzene, toluene or hexane, may be employed.

The aminocarboxylic acid amide membrane thus obtained may be converted to a diamine membrane by reacting it with a reducing agent. As such a reducing agent, lithium aluminum hydride or diborane may be employed. However, from the viewpoint of the reaction efficiency, it is preferred to employ diborane. The diborane to be used, may be generated, for instance, by reacting a boron trifluoride-ether complex to sodium borohydride, or various complexes of borane, such as a methyl sulfide complex, may be employed.

The reaction may be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having the groups involving quaternary ammonium groups. As such an alkylating agent, there may be mentioned methyl iodide, methyl bromide, n-propyl bromide, trimethyloxonium fluoroborate (($CH_3$)$_3$OBF$_4$), triethyloxonium fluoroborate (($C_2H_5$)$_3$OBF$_4$), trimethyloxonium hexachloroantimonate (($CH_3$)$_3$OSbCl$_6$) or methyl trifluoromethanesulfonate. For this alkylation, methanol, ethanol, methylene chloride, chloroform or carbon tetrachloride may be employed as the solvent.

Here, if it is necessary to exchange the counter ions of the membrane having the groups involving quaternary ammonium groups thus obtained, such an exchange can be conducted by the treatment with an alkali metal salt by a conventional method.

The anion exchange membranes thus prepared may have substantially the same structures as the specific examples given above.

The carboxylate membrane can be adjusted so that the resulting anion exchange membrane has an ion exchange capacity of from 0.16 to 3.0 meq/g dry resin. It is preferred to adjust the carboxylate membrane so that the ion exchange capacity of the anion exchange membrane will be from 0.5 to 2.0 meq/g dry resin.

Further, the carboxylate membrane can be adjusted so that the resulting anion exchange membrane has a thickness within a range of from 40 to 500 μm, preferably from 100 to 300 μm. A reinforcing material may be incorporated to increase the strength of the membrane.

The ion exchange capacity of the surface treated with an acid or base is relatively small at a level of from 1.0 to 0.7 meq/g dry resin. Whereas, the ion exchange capacity of the non-treated surface is relatively large at a level of from 1.0 to 1.4 meq/g dry resin. It is possible to suppress the leakage of the metal ions and/or metal complex ions by disposing the membrane so that the surface treated with an acid or base faces the cathode compartment, whereby it is possible to produce a metal salt efficiently under a stabilized condition for a long period of time in a two compartment electrolytic cell wherein this anion exchange membrane is used.

Furthermore, one of the examples for appropriate selection of an anion exchange membrane in accordance with the kind of electrolytic solution will be mentioned. Namely, when the electrolytic solution is cyanide aqueous, the fluorinated anion exchange membrane preferably has, as the group involving a quaternary ammonium group, a group of the formula:

$$-\underset{\underset{O}{\parallel}}{\overset{\overset{O}{\parallel}}{S}}-\underset{R^4}{N}+CH_2\rightarrow_b\overset{\oplus}{N}\begin{matrix}R^1\\R^2\\R^3\end{matrix}\quad Z^{\ominus}$$

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, $Z^{\ominus}$ is a halogen anion, and b is an integer of from 2 to 10.

This anion exchange membrane shows remarkable durability against the cyanide solution so that it is possible to produce a metal salt efficiently under a stabilized condition for a long period of time in a two compartment electrolytic cell, wherein this anion exchange membrane is used.

Now, the present invention will be described in further detail with reference to Examples. However, it should be understood that the present invention is by no means restricted to such specific Examples.

EXAMPLE 1

An aqueous acid solution was supplied to both the anode compartment 2 and the cathode compartment 3 of the diaphragm electrolytic cell 1, and electrolysis was conducted by using a platinum electrode as the anode, whereby a platinum salt was produced.

The electrolytic conditions are shown in Table 1.

TABLE 1

Electrolytic conditions

Figure 2:
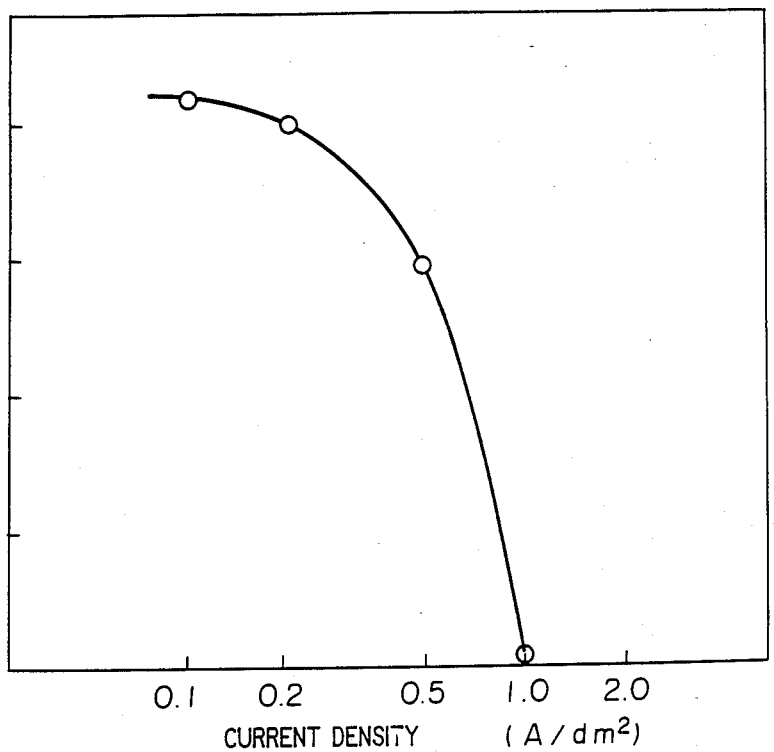
FIG. 2 is a graph showing the relationship between the current density and the current efficiency for dissolving platinum.

Anolyte composition: 36% Hydrochloric acid aqueous solution
Catholyte composition: 5% Hydrochloric acid aqueous solution
Amount of the electrolyte in each compartment: 100 ml
Electrodes:
  Anode: Platinum electrode
  Cathode: Titanium electrode
Electrode surface area: 12 cm$^2$
Amount of electricity: 170 Coulomb FIG. 2 shows the change in the current efficiency for dissolving platinum due to the current density. When the current density was 0.1 A/dm$^2$, the current efficiency was high. Therefore, in the subsequent operation, the current density was adjusted to 0.1 A/dm$^2$.

As the anion exchange membrane, a fluorinated anion exchange membrane shown by the following formula was employed:

$$+CF_2-CF_2\rightarrow+CF_2CF\rightarrow\\ \underset{\underset{\underset{\underset{\underset{O-CF_2-CH_2-\overset{\oplus}{N}-CH_3}{F_3C-CF}}{|}}{CF_2}}{|}}{|}\begin{matrix}\\\\\\CH_3\\Cl^{\ominus}\\CH_3\end{matrix}$$

The characteristic values of this anion exchange membrane are shown in Table 2.

TABLE 2

Characteristic values

Ion exchange capacity: 1.43 meq/g dry resin
Electric resistance: 2.8 Ωcm$^2$
Anion selectivity: >0.96
Thickness: 320 μm The results of measurement are shown in Table 3.

TABLE 3

Results of measurements

Amount of dissolved platinum: 18.08 mg
Current efficiency for dissolving platinum: 20.7%
The amount of leaked platinum: 3.60%
Ammonium chloride was added to the concentrated hydrochloric acid solution in which platinum was dissolved, whereby yellow precipitates formed, which were dehydrated, dried and subjected to X-ray analysis, whereby the chemical composition was found to be mainly ammonium hexachloroplatinate (IV) $(NH_4)_2PtCl_6$.

EXAMPLE 2

An aqueous potassium cyanide solution having a concentration of 3 mol/liter was supplied to both compartments 2 and 4 of the diaphragm electrolytic cell 1, and electrolysis was conducted. The electrolytic conditions were as shown in Table 4.

TABLE 4

Electrolytic conditions

Current density: 1 A/cm$^2$
Electrodes:
  Anode: Gold
  Cathode: Platinum
Temperature: 60° C.
Anolyte and catholyte: 3 mol/liter KCN aqueous solution
Amount of anolyte: 5 ml
Amount of catholyte: 50 ml
Membrane surface area: 3.14 cm$^2$ The anion exchange membrane used is represented by the following formula:

$$-[(CF_2-CF_2)_p(CF_2-CF)_q]-$$
$$|$$
$$O$$
$$|$$
$$CF_2$$
$$|$$
$$F_3C-CF$$
$$|$$
$$O \quad\quad O \quad CH_3 \quad\quad CH_3$$
$$| \quad\quad || \quad | \quad\quad |\oplus$$
$$(CF_2)_2-S-N-(CH_2)_3N-CH_3 \;\; Cl^\ominus$$
$$|| \quad\quad |$$
$$O \quad\quad CH_3$$

wherein p and q are positive numbers, and the ratio of p/q is from 2 to 16.

The characteristic values of this anion exchange membrane are shown in Table 5.

TABLE 5
Characteristic values

Figure 3:
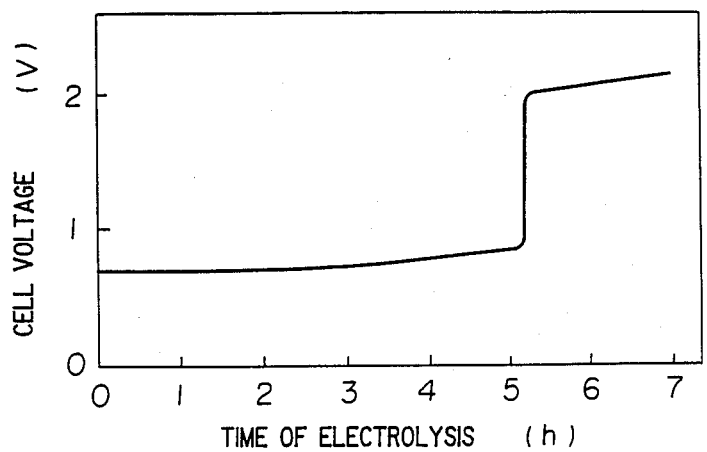
FIG. 3 is a graph showing the change of a cell voltage in an example of the present invention.

Ion exchange capacity: 0.91 meq/g dry resin
Electric resistance: 4.0 Ωcm²
Anion selectivity: >0.97
Thickness: 230 μm The change with time of the cell voltage was as shown in FIG. 3.

When the electrolysis was conducted continuously for 5 hours 10 minutes, the concentration of gold potassium cyanide reached the limiting level, whereupon the reaction for the formation of gold potassium cyanide terminated, and at the same time the cell voltage abruptly rose from 0.9 V to 2 V. Electrolysis was discontinued, since the decomposition of gold potassium cyanide was likely to take place if the electrolysis further continued.

The concentration of the aqueous gold potassium cyanide solution, the electrolytic performance, etc. were shown in Table 6.

TABLE 6

| | |
|---|---|
| Compositional ratio as KAu(CN)$_2$/KCN + KAu(CN)$_2$ | 96.5% |
| Concentration | 1.26 mol/liter |
| Leakage of gold | 1.7% |
| pH | <12.4 |
| Efficiency for dissolving gold | 98% |
| Cell voltage | 0.7–0.9 |

The pH value was the same as the pH of the aqueous gold potassium cyanide.

EXAMPLE 3

As the anion exchange membrane, the fluorinated anion exchange membrane with the ion exchange capacity different from one side to the other side was employed. The structure formula of this anion exchange membrane is the same as in Example 2.

The characteristic values of this anion exchange membrane are shown in Table 7.

TABLE 7

| | Characteristic values |
|---|---|
| Ion exchange capacity: | one side 0.91 meq/g dry resin |
| | the other side 0.67 meq/g dry resin |
| Electric resistance: | 5.9 Ωcm² |
| Anion selectivity: | >0.97 |
| Thickness: | 440 μm |

Electrolysis was conducted by disposing the membrane so that the side having the small ion exchange capacity faced the anode under the same condition as in Example 2.

The results of measurements are shown in Table 8.

TABLE 8

| | |
|---|---|
| Compositional ratio as KAu(CN)$_2$/KCN + KAu(CN)$_2$ | 96.5% |
| Concentration | 1.288 mol/liter |
| Leakage of gold | 0% |
| pH | <12.4 |
| Efficiency for dissolving gold | 98% |
| Cell voltage | 0.7–0.9 V |

The leakage of dissolved gold decreased to almost 0% by using this anion exchange membrane with the ion exchange capacity different from one side to the other side.

EXAMPLE 4

As the anion exchange membrane, the fluorinated anion exchange membrane obtained by the following process, was employed.

Firstly, one side of a carboxylate membrane having the following structural formula:

$$-(CF_2-CF_2)-(CF_2-CF)-$$
$$|$$
$$O$$
$$|$$
$$CF_2$$
$$|$$
$$CF_3-CF$$
$$|$$
$$O-CF_2-CF_2-CF_2-COOCH_3$$

was treated with 14% aqueous ammonia at 20° C. for 1 hour, followed by vacuum drying at 60° C.

Then, the membrane thus obtained was immersed in dry tetrahydrofuran under a nitrogen atmosphere, and while supplying dimethylamine gas under cooling with ice, reacted under cooling for 12 hours and at 25° C. for 36 hours.

Then, the membrane was vacuum-dried at 60° C. to obtain a carboxylic acid amide membrane.

Then, sodium borohydride was added to dry tetrahydrofuran under a nitrogen atmosphere, and the membrane obtained as above, was immersed therein. A boron trifluoride-ether complex was dropwise added thereto. The membrane was reacted at a refluxing temperature for 20 hours and converted to an amine membrane.

The membrane thus obtained was washed with tetrahydrofuran and methanol, and then immersed in a methanol solution of methyl iodide, and reacted at 60° C. for 96 hours.

Then, this membrane was immersed in a mixture of hydrochloric acid/methanol=½ to obtain a desired fluorinated anion exchange membrane having quaternary ammonium chloride groups.

The structure of the fluorinated anion exchange membrane thus obtained is shown by the following formula:

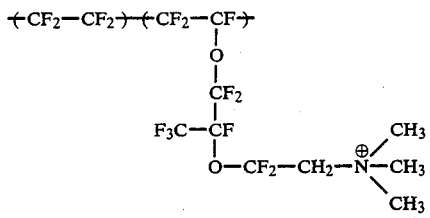

This structure formula is the same as in Example 1.

However, the ion exchange capacity of this anion exchange membrane is 0.7 meq/g resin and smaller than that is Example 1 (1.43 meq/g resin) although the other characteristic values (electric resistance, anion selectivity, and thickness) are almost the same as in Example 1.

The electrolysis was conducted by disposing the membrane so that the side having the small ion exchange capacity faced the anode under the same condition as in Example 1.

The results of measurements are shown in Table 9.

TABLE 9

| Results of measurements | |
|---|---|
| Amount of dissolved platinum | 18.17 mg |
| Current efficiency for dissolving platinum | 20.8% |
| The amount of leaked platinum | 0.14 mg |
| Platinum leaking rate | 0.78% |

From the comparison of Examples 1 and this Example, it is evident that the leakage of platinum can substantially be suppressed by using a fluorinated anion exchange membrane with its one side treated with a base and conducting electrolysis by disposing the membrane with the treated side facing to the anode, as compared with the case where a non-treated membrane is used.

The ammonium hexachloroplatinate (IV) $(NH_4)_2PtCl_6$ was produced in the same way as in Example 1.

We claim:

1. A method for producing a metal salt by electrolysis in an electrolytic cell comprising an anode compartment and a cathode compartment partitioned by a diaphragm, characterized by disposing in the anode compartment a metal anode soluble in an aqueous electrolyte solution, and conducting electrolysis to dissolve the metal anode, wherein the diaphragm is a fluorinated anion exchange membrane made of a copolymer having repeating units of the formula:

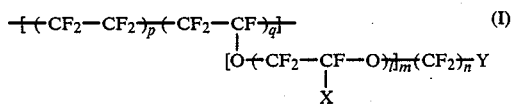

wherein X is F or $CF_3$, l is an integer of from 0 to 5, m is 0 or 1, n is an integer of 1 to 5, each of p and q is a positive number and the ratio of p/q is from 2 to 16, and Y is a group involving a quaternary ammonium group.

2. The method according to claim 1, wherein the group involving a quaternary ammonium group has the formula:

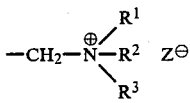

wherein each of $R^1$, $R^2$ and $R^3$ is a lower alkyl group, provided that $R^1$ and $R^2$ may together form a tetramethylene group or a pentamethylene group, and $Z^\ominus$ is a halogen anion.

3. The method according to claim 1, wherein the group involving a quaternary ammonium group has the formula:

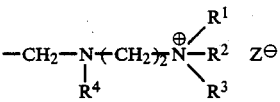

wherein each of $R^1$, $R^2$ and $R^3$ is a lower alkyl group, provided $R^1$ and $R^2$ may together form a tetramethylene group or a pentamethylene group, $R^4$ is a hydrogen atom or a lower alkyl group, and $Z^\ominus$ is a hydrogen anion.

4. The method according to claim 1, wherein the group involving a quaternary ammonium group has the formula:

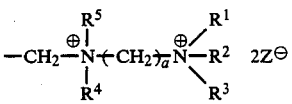

wherein each of $R^1$, $R^2$ and $R^3$ is a lower alkyl group, provided $R^1$ and $R^2$ may together form a tetramethylene group or a pentamethylene group, each of $R^4$ and $R^5$ is a hydrogen atom or a lower alkyl group, $Z^\ominus$ is halogen anion, and a is an integer of from 3 to 7.

5. The method according to claim 1, wherein the group involving a quaternary ammonium group has the formula:

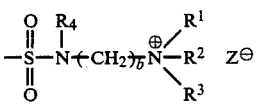

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, provided $R^3$ and $R^4$ may together form an ethylene group or a trimethylene group, $Z^\ominus$ is a halogen anion, and b is an integer of from 2 to 10.

6. The method according to claim 2, the ion exchange capacities of the anion exchange membrane vary from one phase to the other phase between 0.16 meq/g. dry resin and 3.0 meq/g dry resin.

7. The method according to claim 1, wherein the anion exchange membrane is a fluorinated anion exchange membrane prepared by subjecting a carboxylate membrane made of a copolymer having repeating units of the formula:

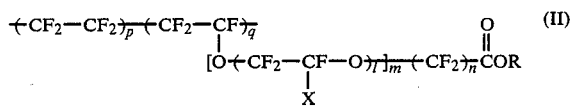

(II)

wherein X is F or $CF_3$, l is an integer of from 0 to 5, m is 0 or 1, n is an integer of from 1 to 5, and p/q is from 4 to 16, and R is an alkyl group, to an acid or base treatment, and then introducing anion exchange groups thereinto.

8. The method according to claim 1, wherein the solution is an aqueous solution of a cyanide, and the group involving a quaternary ammonium group has the formula:

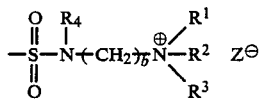

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, provided $R^3$ and $R^4$ may together form an ethylene group or a trimethylene group, $Z^{\ominus}$ is a halogen anion, and b is an integer of from 2 to 10.

9. In a method for producing a metal salt by electrolysis in an electrolytic cell which comprises an anode compartment and a cathode compartment partitioned by a diaphragm, and wherein a metal anode soluble in an aqueous electrolyte solution is disposed in the anode compartment, said method comprising conducting electrolysis to dissolve said metal anode, the improvement which comprises:

employing a diaphragm which is constituted by a fluorinated anion exchange membrane made of a copolymer having repeating units of the formula:

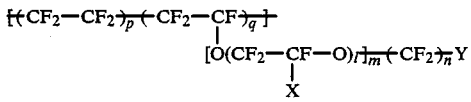

wherein X is F or $CF_3$, l is an integer of from 0 to 5, m is 0 or 1, n is an integer of 1 to 5, each of p and q is a positive number and the ratio of p/q is from 2 to 16, and Y is a group involving a quaternary ammonium group, wherein said membrane has an ion exchange capacity of from 0.16 to 3.0 meq/g dry resin.

10. The method of claim 1, wherein said anode is made up of a metal selected from the group consisting of Pt, Au, Ag, Fe, Ni and Co.

11. A method according to claim 1, wherein a cathode in said cathode compartment is made up of Ti, Ta, Zr or Nb, or an electrode obtained by coating Pt, Ir or Rh or an oxide thereof on the surface of a substrate of these metals.

* * * * *